(12) United States Patent
Kim et al.

(10) Patent No.: US 8,275,063 B2
(45) Date of Patent: Sep. 25, 2012

(54) METHOD FOR TRANSMITTING AND RECEIVING PRECODED SIGNAL IN MIMO COMMUNICATION SYSTEM

(75) Inventors: Jae Wan Kim, Anyang-si (KR); Su Nam Kim, Anyang-si (KR); Dong Guk Lim, Anyang-si (KR); Bin Chul Imh, Anyang-si (KR); Ja Ho Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/382,816

(22) Filed: Mar. 24, 2009

(65) Prior Publication Data
US 2009/0238298 A1 Sep. 24, 2009

(30) Foreign Application Priority Data
Mar. 24, 2008 (KR) .................. 10-2008-0027094

(51) Int. Cl.
*H04B 7/02* (2006.01)
(52) U.S. Cl. ........ 375/267; 375/260; 375/299; 375/340; 375/347; 455/101; 455/132; 455/296; 455/500; 455/562.1; 370/334; 370/464; 341/173; 341/180
(58) Field of Classification Search .................. 375/260, 375/267, 299, 340, 347; 455/101, 132, 296, 455/500, 562.1; 370/334, 464; 341/173, 341/180
See application file for complete search history.

(56) References Cited

U.S. PATENT DOCUMENTS
2008/0063115 A1* 3/2008 Varadarajan et al. .......... 375/299
2008/0303701 A1* 12/2008 Zhang et al. .................. 341/106
* cited by examiner

*Primary Examiner* — Leon Flores
(74) *Attorney, Agent, or Firm* — McKenna Long & Aldridge LLP

(57) ABSTRACT

A method for transmitting and receiving a precoded signal in a Multi-Input Multi-Output (MIMO) communication system is provided. In the method, a preceding matrix is selected from a codebook including one or more preceding matrices of each rank, each of the preceding matrices including a unitary matrix modified by an antenna selection element. A signal for transmission is then precoded by applying the selected preceding matrix to the signal for transmission and the precoded signal is transmitted through a selected antenna.

10 Claims, 3 Drawing Sheets

METHOD FOR TRANSMITTING AND RECEIVING PRECODED SIGNAL IN MIMO COMMUNICATION SYSTEM

This application claims the benefit of Korean Patent Application No. 10-2008-0027094, filed on Mar. 24, 2008, which is hereby incorporated by reference as if fully set forth herein.

BACKGROUND OF THE INVENTION

1. Field of the Invention

The present invention relates to a Multi-Input Multi-Output (MIMO) communication system, and more particularly, to a method for transmitting and receiving a precoded signal in a MIMO communication system.

2. Discussion of the Related Art

Recently, demand for wireless communication services has rapidly increased due to the spread of information communication services, the introduction of a variety of multimedia services, and the advent of high-quality services. To actively cope with such demand, first of all, it is necessary to increase the capacity of the communication system. Exemplary methods of increasing the communication capacity in wireless communication environments include a method of discovering a new available frequency band and a method of increasing the efficiency of limited resources. As a method for increasing the efficiency of limited resources, a so-called Multi-Input Multi-Output (MIMO) communication technology, in which multiple antennas are installed on a transmitter/receiver to secure an additional spatial area for utilization of resources, thereby achieving a diversity gain, and data is transmitted in parallel through the multiple antennas to increase transmission capacity, has recently been intensively developed while attracting a lot of attention.

The MIMO communication system requires a variety of technologies to increase the reliability of data transmission. Among these technologies, a preceding scheme is used to increase a Signal to Noise Ratio (SNR). Examples of the preceding scheme include a codebook-based preceding scheme, which is used when feedback information is limited in a closed-loop system, and a scheme in which channel information is quantized and fed back. In the codebook-based preceding, the receiving end feeds an index of a preceding matrix, which is already known to both the receiving end and the transmitting end, back to the transmitting end to achieve an SNR gain.

Since feedback of all channel information causes significant overhead, a MIMO preceding scheme, which uses partial channel information, has been standardized and applied to actual systems. In the MIMO preceding scheme, channel information is quantized to construct a codebook and an index allocated to each codebook component is transmitted through a control channel.

FIG. 1 illustrates example configurations of transmitting and receiving ends of a MIMO communication system which uses codebook-based precoding.

In FIG. 1, each of the transmitting and receiving ends contains a limited number of precoding matrices P1 to PL, the receiving end feeds an optimal feedback index (i.e., an optimal preceding matrix index 1) back to the transmitting end using channel information, and the transmitting end applies a preceding matrix corresponding to the fed-back index to transmission data ($X_1$ to $X_{Mt}$).

The MIMO preceding scheme is a closed-loop MIMO scheme in which part or all of channel information is fed back to a base station or a terminal to achieve improvement of communication performance. This scheme exhibits advantageous effects, especially in a slow fading environment of 30 Km or less per hour.

For reference, the following Table 1 illustrates an example codebook that can be applied when 3-bit feedback information is used in an IEEE 802.16e system which has 2 transmit antennas and which supports a spatial multiplexing rate of 2.

TABLE 1

| Matrix Index (binary) | Column 1 | Column 2 |
|---|---|---|
| 000 | 1 | 0 |
|  | 0 | 1 |
| 001 | 0.7940 | −0.5801 − j0.1818 |
|  | −0.5801 + j0.1818 | −0.7940 |
| 010 | 0.7940 | 0.0579 − j0.6051 |
|  | 0.0579 + j0.6051 | −0.7940 |
| 011 | 0.7941 | −0.2978 + j0.5298 |
|  | −0.2978 − j0.5298 | −0.7941 |
| 100 | 0.7941 | 0.6038 − j0.0689 |
|  | 0.6038 + j0.0689 | −0.7941 |
| 101 | 0.3289 | 0.6614 − j0.6740 |
|  | 0.6614 + j0.6740 | −0.3289 |
| 110 | 0.5112 | 0.4754 + j0.7160 |
|  | 0.4754 − j0.7160 | −0.5112 |
| 111 | 0.3289 | −0.8779 + j0.3481 |
|  | −0.8779 − j0.3481 | −0.3289 |

On the other hand, technologies such as Per Antenna Rate Control (PARC), Per Stream Rate Control (PSRC), and Per User Unitary Rate Control (PU2RC) suggested in the 3GPP Long Term Evolution (LTE) standard can also be implemented in a MIMO system structure. In 3GPP LTE, a preceding scheme has also been introduced as a closed-loop MIMO system scheme. Examples of the preceding scheme include PU2RC and SIC-based Per User and Stream Rate Control (S-PUSRC).

In the case of the PU2RC scheme, matrices extended according to the number of transmit antennas using the Fourier transform are used as unitary matrices for preceding as shown in the following Mathematical Expression 1.

$$e_m^{(g)} = \frac{1}{\sqrt{M}} \left[ w_{0m}^{(g)}, F, w_{(M-1)m}^{(g)} \right]^T \quad \text{[Mathematical Expression 1]}$$

$$w_{nm}^{(g)} = \exp\left\{ j \frac{2\pi n}{M} \left( m + \frac{g}{G} \right) \right\}$$

In Mathematical Expression 1, $e_m^{(g)}$ is a unitary preceding vector, "M" denotes the total number of antennas, and "G" denotes the total number of groups of preceding matrices. In addition, "n" and "g" denote an nth antenna and a gth group, respectively. A preceding matrix can be specified using the numbers "n" and "g." Also, "m" denotes an mth virtual beamforming pattern.

In the case of S-PUSRC, a switching beamforming vector is used as a preceding matrix as shown in the following Mathematical Expression 1.

$$P = [a_1, a_2 F a_{2N}]$$

$$a_i = [1, e^{j\phi_i}, F, e^{j(N-1)\phi_i}],$$

$$\phi_i = kd \sin(\theta_i) \quad \text{[Mathematical Expression 2]}$$

where "N" denotes the number of antenna elements, "$a_i$" denotes a preceding vector, "k" denotes a wavelength, "θ"

denotes a steering direction, and "d" denotes the distance between neighboring antenna elements.

In the case of single-user MIMO of the closed-loop system, accuracy varies according to the amount of data of an antenna weight fed back from a terminal and thus MIMO performance depends on the amount of such feedback data. Especially, when the number of transmit antennas is 4, the size of the corresponding codebook is large and therefore the amount of feedback data is also large.

In addition, reception performance is significantly affected by how a codebook is designed. Accordingly, it is important to design a codebook which exhibits high performance while reducing the amount of feedback data. Another important factor when a MIMO codebook is designed is the complexity of the receiver which receives the codebook.

Although conventional codebooks exhibit excellent performance for channels with a low degree of correlation, they have been designed such that they have difficulty achieving a performance improvement when the degree of channel correlation is high. Thus, the conventional codebooks tend to exhibit different performances depending on the structure and interval of antennas. The conventional codebooks also have problems in that it is not easy to extend the codebook size and it is also difficult to design a systematic codebook having adaptability according to the channel status (for example, according to the rank).

SUMMARY OF THE INVENTION

Accordingly, the present invention is directed to a method for transmitting and receiving a precoded signal in a MIMO communication system that substantially obviates one or more problems due to limitations and disadvantages of the related art.

An object of the present invention is to provide a method for transmitting and receiving a precoded signal using a codebook in a Multi-Input Multi-Output (MIMO) communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a precoded signal in a Multi-Input Multi-Output (MIMO) communication system includes selecting a precoding matrix from a codebook including one or more preceding matrices of each rank, each of the preceding matrices including a unitary matrix modified by an antenna selection element, preceding a signal for transmission by applying the selected preceding matrix to the signal for transmission, and transmitting the precoded signal through a selected antenna.

In another aspect of the present invention, a method for receiving a precoded signal in a Multi-Input Multi-Output (MIMO) communication system includes receiving a precoded signal, and obtaining preceding matrix information from a codebook including one or more preceding matrices of each rank, each of the preceding matrices including a unitary matrix modified by an antenna selection element, and decoding the precoded signal based on the preceding matrix information.

In these aspects, the preceding matrix may include a combination of an antenna selection matrix and a unitary matrix determined according to the number of antennas selected according to the antenna selection matrix. In addition, the unitary matrix may be a Discrete Fourier Transform (DFT) matrix.

Further, the preceding matrix may be constructed using a phase shift matrix determined according to the number of selected antennas.

In the codebook, a codebook size of rank 1 and rank 2 may be larger than a codebook size of rank 3 and rank 4.

In another aspect of the present invention, a method for transmitting a precoded signal in a Multi-Input Multi-Output (MIMO) communication system includes selecting a precoding matrix from a codebook including one or more preceding matrices of each rank, preceding a signal for transmission by applying the selected preceding matrix to the signal for transmission, and transmitting the precoded signal, wherein, in the codebook, a codebook size of at least one lower rank is larger than a codebook size of at least one higher rank.

In another aspect of the present invention, a method for receiving a precoded signal in a Multi-Input Multi-Output (MIMO) communication system includes receiving a precoded signal, and obtaining precoding matrix information from a codebook including one or more preceding matrices of each rank, each of the preceding matrices including a unitary matrix modified by an antenna selection element, and decoding the precoded signal based on the precoding matrix information, wherein, in the codebook, a codebook size of at least one lower rank is larger than a codebook size of at least one higher rank.

In these aspects, the at least one lower rank may include rank 1 and rank 2 and the at least one higher rank may include rank 3 and rank 4. In addition, the precoding matrix may include a combination of an antenna selection matrix and a Discrete Fourier Transform (DFT) matrix determined according to the number of antennas selected according to the antenna selection matrix.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Preferred embodiments of the present invention will now be described in detail with reference to the accompanying drawings.

Figure 1:
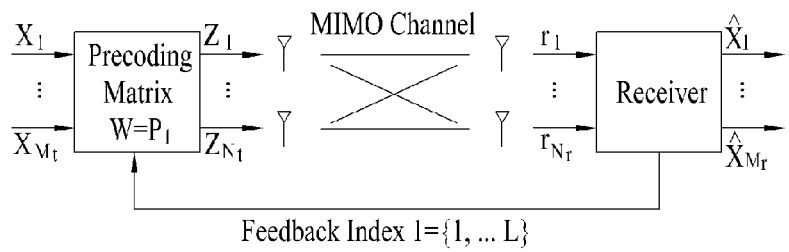
FIG. 1 illustrates example configurations of transmitting and receiving ends of a MIMO communication system which uses codebook-based preceding.
Figure 2:
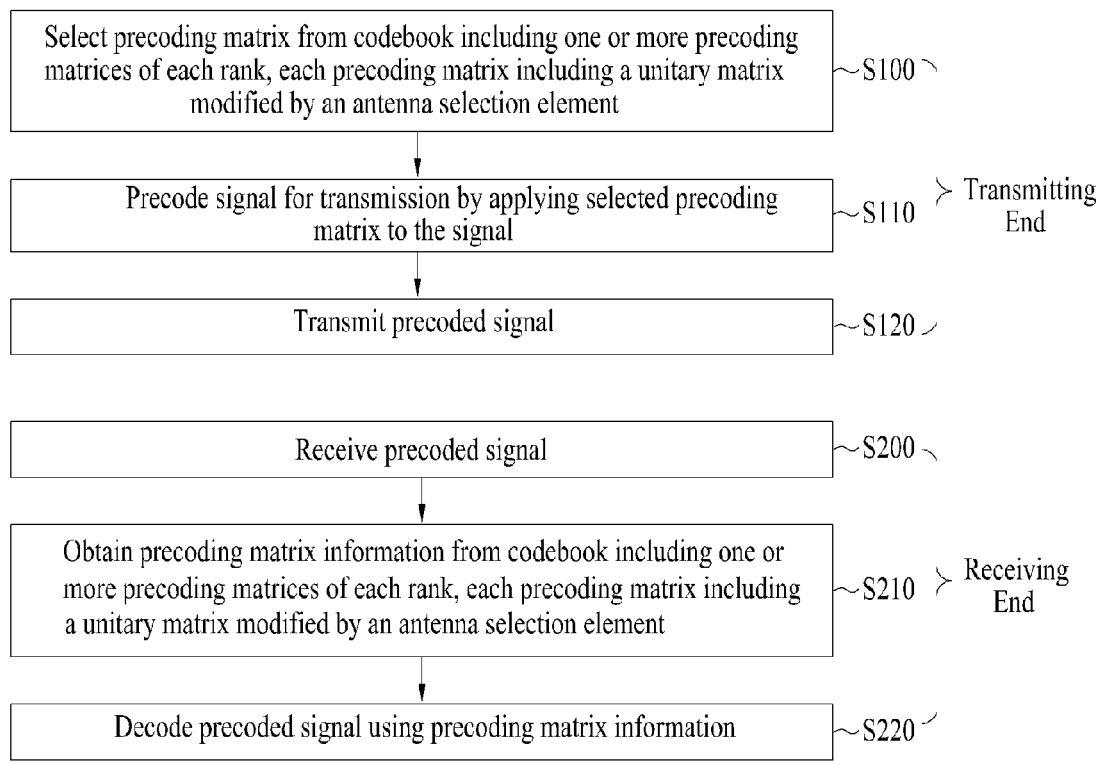
FIG. 2 is a flow chart illustrating an example method for transmitting and receiving a precoded signal in a MIMO system according to an embodiment of the present invention.

FIG. 2 is a flow chart illustrating an example method for transmitting and receiving a precoded signal in a MIMO system according to an embodiment of the present invention.

The present invention is characterized in that, in a codebook-based preceding scheme, an element enabling antenna selection has been applied to a precoding matrix which can be selected from a codebook. When an antenna, which is in a deep fading state, is present during communication, this antenna is excluded and the remaining antennas are used to transmit data so that a path, which is in a good transmission channel state, can be selected to perform transmission.

In this embodiment, as shown in FIG. 2, first, a transmitting end selects a preceding matrix from a codebook which includes at least one preceding matrix, including a unitary matrix modified by an antenna selection element, for each rank at step S100.

Here, the term "unitary matrix" refers to a matrix that satisfies two constraints, i.e., a power constraint that columns should have a size of 1 and an orthogonality constraint that each column should be orthogonal to each other. If preceding is performed using a unitary matrix that has such characteristics, there is an advantage in that it is possible to reduce loss of channel capacity in the MIMO communication system.

Here, the term "rank" refers to the number of transmission streams that can be transmitted through multiple antennas at once. In this case, additional information regarding the rank should be shared between transmitting and receiving ends at the initial stage of communication or when the rank has been changed. For example, the receiving end should not only transmit preceding matrix information but should also separately transmit rank information. However, according to the present invention, it is possible to use a codebook including one or more preceding matrices of each of a plurality of ranks.

When the codebook according to the present invention is used, a Precoding Matrix Index (PMI) indicating a preceding matrix included in the codebook contains information regarding rank adaptation. Accordingly, even when additional rank information for rank adaptation is not transmitted, the receiving end, which has received the PMI, can obtain rank information. Thus, if the codebook according to this embodiment is used, there is an advantage in that it is possible to reduce the amount of overhead information transmitted through a control channel.

Specifically, this embodiment is characterized in that preceding is performed using a preceding matrix selected from a codebook shared between the transmitting and receiving ends according to a codebook-based preceding scheme, wherein the codebook includes one or more preceding matrices of each of one or more ranks and at least one of the preceding matrices is given an antenna selection function to select or exclude at least part of all antennas included in the transmitting end.

Then, the transmitting end performs precoding on a signal for transmission by applying the preceding matrix selected at step S110 to the signal for transmission and transmits the precoded signal to the receiving end at step S120.

Then, the receiving end receives the precoded signal at step S200, obtains preceding matrix information from the codebook used at the transmitting end at step S210, and decodes the signal received at step S200 using the preceding matrix information at step S220.

On the other hand, the receiving end may measure channel quality based on a pilot signal transmitted by the transmitting end, select an appropriate preceding matrix from the codebook based on the measured channel quality, and transmit index information of the preceding matrix as feedback information.

In this embodiment, when a precoding matrix is selected from a codebook including preceding matrices, each including an antenna selection element, the preceding matrix can be selected using feedback information received from the receiving end, for example preceding matrix index information or Channel Quality Information (CQI). The codebook according to this embodiment has an advantage in that a preceding matrix can be selected from the codebook taking into consideration the rank without using separate rank information since the codebook according to this embodiment includes one or more preceding matrices of each of a plurality of ranks as described above.

Reference will now be made in detail to an example method for designing a codebook including precoding matrices, each including a unitary matrix modified by an antenna selection element. The codebook design method is described below with reference to the case where 4 transmit antennas are used.

In the codebook design method, first, an antenna may be selected using an antenna selection matrix. Table 2 illustrates an example of an antenna selection matrix according to the number of antennas that are selected.

TABLE 2

| Number of Selected Antennas | Antenna Selection Matrix |
|---|---|
| 4 | $\begin{bmatrix} S_1 \\ S_2 \\ S_3 \\ S_4 \end{bmatrix}$ |
| 3 | $\begin{bmatrix} S_1 & 0 & S_1 & S_1 \\ S_2 & S_1 & S_2 & 0 \\ S_3 & S_2 & 0 & S_2 \\ 0 & S_3 & S_3 & S_3 \end{bmatrix}$ |
| 2 | $\begin{bmatrix} S_1 & 0 & 0 & S_1 & S_1 & 0 \\ S_2 & S_1 & 0 & 0 & 0 & S_1 \\ 0 & S_2 & S_1 & S_2 & 0 & 0 \\ 0 & 0 & S_2 & 0 & S_2 & S_2 \end{bmatrix}$ |
| 1 | $\begin{bmatrix} S_1 & 0 & 0 & 0 \\ 0 & S_1 & 0 & 0 \\ 0 & 0 & S_1 & 0 \\ 0 & 0 & 0 & S_1 \end{bmatrix}$ |

As shown in Table 2, the number of possible combinations of selected antennas when 4 antennas are all selected is "1" ($=_4C_4$), the number of possible combinations when three of the 4 antennas are selected is "4" ($=_4C_3$), the number of possible combinations when two of the 4 antennas are selected is "6" ($=_4C_2$), and the number of possible combinations when one of the 4 antennas is selected is "4" ($=_4C_1$).

The transmitting end may determine both the number of selected antennas and which antennas are selected through feedback information (for example, channel quality information) from the receiving end. This determination can be considered selection of a column vector in an appropriate antenna selection matrix from a plurality of antenna selection matrices shown Table 2.

In this manner, an antenna may be selected using an antenna selection matrix and then a path for the selected antennas may be selected using a unitary matrix. Here, the unitary matrix may be determined for each number of selected antennas. A Discrete Fourier Transform (DFT) matrix may be used as the unitary matrix. Table 3 illustrates an example DFT matrix according to the number of selected antennas.

TABLE 3

| Number of Selected Antennas | DFT Matrix |
|---|---|
| 4 | $\frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}$ |
| 3 | $\frac{1}{\sqrt{3}}\begin{bmatrix} 1 & 1 & 1 \\ 1 & -0.5000 + j0.8660 & -0.5000 - j0.8660 \\ 1 & -0.5000 - j0.8660 & -0.5000 + j0.8660 \end{bmatrix}$ |
| 2 | $\frac{1}{\sqrt{2}}\begin{pmatrix} 1 & 1 \\ 1 & -1 \end{pmatrix}$ |
| 1 | 1 |

When 4 transmit antennas are used, ranks of 1 to 4 can be defined. Ranks that can be applied are limited by the number of selected antennas. That is, ranks should be smaller than or equal to the number of selected antennas. Then, it is necessary to use an appropriate preceding matrix for each rank, which can be constructed by combining DFT matrices shown in Table 3. For example, the number of DFT matrices which can be constructed by combining column vectors of DFT matrices in the case where 4 antennas are selected in Table 3 can be expressed by the following Table 4.

TABLE 4

| Rank 1 | Rank 2 | Rank 3 | Rank 4 |
|---|---|---|---|
| 4 | 6 | 4 | 1 |

In addition, the number of DFT matrices which can be constructed by combining column vectors of DFT matrices in the case where 3 antennas are selected in Table 3 can be expressed by the following Table 5.

TABLE 5

| Rank 1 | Rank 2 | Rank 3 |
|---|---|---|
| 3 | 3 | 1 |

Further, the number of DFT matrices which can be constructed by combining column vectors of DFT matrices in the case where 2 antennas are selected in Table 3 can be expressed by the following Table 6.

TABLE 6

| Rank 1 | Rank 2 |
|---|---|
| 2 | 1 |

Finally, when one antenna is selected, the value "1" is directly used as shown in Table 3. In this case, only the rank 1 can be applied.

The total number of combinations of precoding matrices that can be constructed utilizing both the path selection using DFT matrices and the antenna selection using antenna selection matrices described above can be expressed by the following Table 7.

TABLE 7

| Number of Selected Antennas | Number of Possible Antenna Selection Combinations | Number of Possible DFT Combinations | Total Number of Possible Combinations (AS * DFT) |
|---|---|---|---|
| 4 | 1 | 15[4, 6, 4, 1] | 15[4, 6, 4, 1] |
| 3 | 4 | 7[3, 3, 1] | 28[12, 12, 4] |
| 2 | 6 | 3[2, 1] | 18[12, 6] |
| 1 | 4 | 1 | 4[4] |
| Total Number of Possible Combinations | — | — | 65[32, 24, 8, 1] |

As shown in Table 7, in the case where the number of selected antennas is 4, "15[4, 6, 4, 1]" indicates that the respective numbers of possible combinations of the ranks 1 to 4 are 4, 6, 4, and 1 as shown in Table 4 and the total number of possible combinations in this case is 15. Similarly, in the other cases, numbers inside "[ ]" indicate the respective numbers of possible combinations of the ranks, sequentially starting from the rank 1, and a number outside "[ ]" indicates the total number of possible combinations in each case.

From Table 7, it can be seen that the total number of preceding matrices that can be constructed using the above method is 65. That is, since the total size of the designed codebook according to this embodiment is 65, feedback can be provided using 6 bits without requiring rank information when the rank 4 is excluded and feedback can be provided using 7 bits without requiring rank information when the rank 4 is included.

An example 6-bit codebook designed taking into consideration both the path selection using DFT matrices and the antenna selection using antenna selection matrices described above can be expressed by the following Table 8.

TABLE 8

6-bit Codebook

| Rank | Number of Selected Antennas ($\geq$rank) | Precoding Matrix |
|---|---|---|
| 4 | 4 | $\frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}$ |
| 3 | 4, 3 | $\frac{1}{2}\begin{bmatrix} 1 & 1 & 1 \\ 1 & j & -1 \\ 1 & -1 & 1 \\ 1 & -j & -1 \end{bmatrix}, \frac{1}{2}\begin{bmatrix} 1 & 1 & 1 \\ 1 & j & -j \\ 1 & -1 & -1 \\ 1 & -j & j \end{bmatrix}, \frac{1}{2}\begin{bmatrix} 1 & 1 & 1 \\ 1 & -1 & -j \\ 1 & 1 & -1 \\ 1 & -1 & j \end{bmatrix}, \frac{1}{2}\begin{bmatrix} 1 & 1 & 1 \\ j & -1 & -j \\ -1 & 1 & -1 \\ -j & -1 & j \end{bmatrix},$ $\frac{1}{\sqrt{3}}\begin{bmatrix} 1 & 1 & 1 \\ 1 & -0.5000+j0.8660 & -0.5000-j0.8660 \\ 1 & -0.5000-j0.8660 & -0.5000+j0.8660 \\ 0 & 0 & 0 \end{bmatrix},$ $\frac{1}{\sqrt{3}}\begin{bmatrix} 0 & 0 & 0 \\ 1 & 1 & 1 \\ 1 & -0.5000+j0.8660 & -0.5000-j0.8660 \\ 1 & -0.5000-j0.8660 & -0.5000+j0.8660 \end{bmatrix},$ $\frac{1}{\sqrt{3}}\begin{bmatrix} 1 & 1 & 1 \\ 1 & -0.5000+j0.8660 & -0.5000-j0.8660 \\ 0 & 0 & 0 \\ 1 & -0.5000-j0.8660 & -0.5000+j0.8660 \end{bmatrix},$ $\frac{1}{\sqrt{3}}\begin{bmatrix} 1 & 1 & 1 \\ 0 & 0 & 0 \\ 1 & -0.5000+j0.8660 & -0.5000-j0.8660 \\ 1 & -0.5000-j0.8660 & -0.5000+j0.8660 \end{bmatrix},$ |
| 2 | 4, 3, 2 | $\frac{1}{2}\begin{bmatrix} 1 & 1 \\ 1 & j \\ 1 & -1 \\ 1 & -j \end{bmatrix}, \frac{1}{2}\begin{bmatrix} 1 & 1 \\ 1 & -1 \\ 1 & 1 \\ 1 & -1 \end{bmatrix}, \frac{1}{2}\begin{bmatrix} 1 & 1 \\ 1 & -j \\ 1 & -1 \\ 1 & j \end{bmatrix}, \frac{1}{2}\begin{bmatrix} 1 & 1 \\ j & -1 \\ -1 & 1 \\ -j & -1 \end{bmatrix}, \frac{1}{2}\begin{bmatrix} 1 & 1 \\ j & -j \\ -1 & -1 \\ -j & j \end{bmatrix}, \frac{1}{2}\begin{bmatrix} 1 & 1 \\ -1 & -j \\ 1 & -1 \\ -1 & j \end{bmatrix},$ $\frac{1}{\sqrt{3}}\begin{bmatrix} 1 & 1 \\ 1 & -0.5000+j0.8660 \\ 1 & -0.5000-j0.8660 \\ 0 & 0 \end{bmatrix}, \frac{1}{\sqrt{3}}\begin{bmatrix} 1 & 1 \\ 1 & -0.5000-j0.8660 \\ 1 & -0.5000+j0.8660 \\ 0 & 0 \end{bmatrix},$ $\frac{1}{\sqrt{3}}\begin{bmatrix} 1 & 1 \\ -0.5000+j0.8660 & -0.5000-j0.8660 \\ -0.5000-j0.8660 & -0.5000+j0.8660 \\ 0 & 0 \end{bmatrix},$ $\frac{1}{\sqrt{3}}\begin{bmatrix} 0 & 0 \\ 1 & 1 \\ 1 & -0.5000+j0.8660 \\ 1 & -0.5000-j0.8660 \end{bmatrix}, \frac{1}{\sqrt{3}}\begin{bmatrix} 0 & 0 \\ 1 & 1 \\ 1 & -0.5000-j0.8660 \\ 1 & -0.5000+j0.8660 \end{bmatrix},$ $\frac{1}{\sqrt{3}}\begin{bmatrix} 0 & 0 \\ 1 & 1 \\ -0.5000+j0.8660 & -0.5000-j0.8660 \\ -0.5000-j0.8660 & -0.5000+j0.8660 \end{bmatrix},$ |

TABLE 8-continued 6-bit Codebook

| Rank | Number of Selected Antennas (≥rank) | Precoding Matrix |
|---|---|---|

$$\frac{1}{\sqrt{3}}\begin{bmatrix}1 & 1\\ 1 & -0.5000+j0.8660\\ 0 & 0\\ 1 & -0.5000-j0.8660\end{bmatrix}, \frac{1}{\sqrt{3}}\begin{bmatrix}1 & 1\\ 1 & -0.5000-j0.8660\\ 0 & 0\\ 1 & -0.5000+j0.8660\end{bmatrix},$$

$$\frac{1}{\sqrt{3}}\begin{bmatrix}1 & 1\\ -0.5000+j0.8660 & -0.5000-j0.8660\\ 0 & 0\\ -0.5000-j0.8660 & -0.5000+j0.8660\end{bmatrix},$$

$$\frac{1}{\sqrt{3}}\begin{bmatrix}1 & 1\\ 0 & 0\\ 1 & -0.5000+j0.8660\\ 1 & -0.5000-j0.8660\end{bmatrix}, \frac{1}{\sqrt{3}}\begin{bmatrix}1 & 1\\ 0 & 0\\ 1 & -0.5000-j0.8660\\ 1 & -0.5000+j0.8660\end{bmatrix},$$

$$\frac{1}{\sqrt{3}}\begin{bmatrix}1 & 1\\ 0 & 0\\ -0.5000+j0.8660 & -0.5000-j0.8660\\ -0.5000-j0.8660 & -0.5000+j0.8660\end{bmatrix},$$

$$\frac{1}{2}\begin{bmatrix}1 & 1\\ 1 & -1\\ 0 & 0\\ 0 & 0\end{bmatrix}, \frac{1}{2}\begin{bmatrix}0 & 0\\ 1 & 1\\ 1 & -1\\ 0 & 0\end{bmatrix}, \frac{1}{2}\begin{bmatrix}0 & 0\\ 0 & 0\\ 1 & 1\\ 1 & -1\end{bmatrix}, \frac{1}{2}\begin{bmatrix}1 & 1\\ 0 & 0\\ 1 & -1\\ 0 & 0\end{bmatrix}, \frac{1}{2}\begin{bmatrix}1 & 1\\ 0 & 0\\ 0 & 0\\ 1 & -1\end{bmatrix}, \frac{1}{2}\begin{bmatrix}0 & 0\\ 1 & 1\\ 0 & 0\\ 1 & -1\end{bmatrix},$$

| 1 | 4, 3, 2, 1 | |

$$\frac{1}{2}\begin{bmatrix}1\\1\\1\\1\end{bmatrix}, \frac{1}{2}\begin{bmatrix}1\\j\\-1\\-j\end{bmatrix}, \frac{1}{2}\begin{bmatrix}1\\-1\\1\\-1\end{bmatrix}, \frac{1}{2}\begin{bmatrix}1\\-j\\-1\\j\end{bmatrix},$$

$$\frac{1}{\sqrt{3}}\begin{bmatrix}1\\1\\1\\0\end{bmatrix}, \frac{1}{\sqrt{3}}\begin{bmatrix}1\\-0.5000+j0.8660\\-0.5000-j0.8660\\0\end{bmatrix}, \frac{1}{\sqrt{3}}\begin{bmatrix}1\\-0.5000-j0.8660\\-0.5000+j0.8660\\0\end{bmatrix},$$

$$\frac{1}{\sqrt{3}}\begin{bmatrix}0\\1\\1\\1\end{bmatrix}, \frac{1}{\sqrt{3}}\begin{bmatrix}0\\1\\-0.5000+j0.8660\\-0.5000-j0.8660\end{bmatrix}, \frac{1}{\sqrt{3}}\begin{bmatrix}0\\1\\-0.5000-j0.8660\\-0.5000+j0.8660\end{bmatrix},$$

$$\frac{1}{\sqrt{3}}\begin{bmatrix}1\\1\\0\\1\end{bmatrix}, \frac{1}{\sqrt{3}}\begin{bmatrix}1\\-0.5000+j0.8660\\0\\-0.5000-j0.8660\end{bmatrix}, \frac{1}{\sqrt{3}}\begin{bmatrix}1\\-0.5000-j0.8660\\0\\-0.5000+j0.8660\end{bmatrix},$$

$$\frac{1}{\sqrt{3}}\begin{bmatrix}1\\0\\1\\1\end{bmatrix}, \frac{1}{\sqrt{3}}\begin{bmatrix}1\\0\\-0.5000+j0.8660\\-0.5000-j0.8660\end{bmatrix}, \frac{1}{\sqrt{3}}\begin{bmatrix}1\\0\\-0.5000-j0.8660\\-0.5000+j0.8660\end{bmatrix},$$

$$\frac{1}{\sqrt{2}}\begin{bmatrix}1\\1\\0\\0\end{bmatrix}, \frac{1}{\sqrt{2}}\begin{bmatrix}0\\1\\1\\0\end{bmatrix}, \frac{1}{\sqrt{2}}\begin{bmatrix}0\\0\\1\\1\end{bmatrix}, \frac{1}{\sqrt{2}}\begin{bmatrix}1\\0\\1\\0\end{bmatrix}, \frac{1}{\sqrt{2}}\begin{bmatrix}1\\0\\0\\1\end{bmatrix}, \frac{1}{\sqrt{2}}\begin{bmatrix}0\\1\\0\\1\end{bmatrix},$$

TABLE 8-continued 6-bit Codebook

| Rank | Number of Selected Antennas (≥rank) | Precoding Matrix |
|---|---|---|

$$\frac{1}{\sqrt{2}}\begin{bmatrix}1\\-1\\0\\0\end{bmatrix}, \frac{1}{\sqrt{2}}\begin{bmatrix}0\\1\\-1\\0\end{bmatrix}, \frac{1}{\sqrt{2}}\begin{bmatrix}0\\0\\1\\-1\end{bmatrix}, \frac{1}{\sqrt{2}}\begin{bmatrix}1\\0\\-1\\0\end{bmatrix}, \frac{1}{\sqrt{2}}\begin{bmatrix}1\\0\\0\\-1\end{bmatrix}, \frac{1}{\sqrt{2}}\begin{bmatrix}0\\1\\0\\-1\end{bmatrix},$$

$$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix},$$

Although the codebook has been described above as being constructed through a series of processes using a predetermined algorithm, any codebook can be construed as being included in this embodiment, regardless of how it is created, if the created codebook is identical to that of Table 8. That is, a DFT matrix modified by an antenna selection element can be used as a preceding matrix as described above.

In addition, a phase shift matrix illustrated in Table 9 can also be used for phase tracking for each antenna selection type.

TABLE 9

| Number of Selected antennas | Phase-Shift Matrix |
|---|---|
| 4 | $P(\phi_l) = \begin{pmatrix}1 & 0 & 0 & 0\\ 0 & e^{j\phi_l} & 0 & 0\\ 0 & 0 & e^{j2\phi_l} & 0\\ 0 & 0 & 0 & e^{j3\phi_l}\end{pmatrix}$ |
| 3 | $P(\phi_l) = \begin{pmatrix}1 & 0 & 0\\ 0 & e^{j\phi_l} & 0\\ 0 & 0 & e^{j2\phi_l}\end{pmatrix}$ |
| 2 | $P(\phi_l) = \begin{pmatrix}1 & 0\\ 0 & e^{j\phi_l}\end{pmatrix}$ |
| 1 | 1 |

Figure 3:
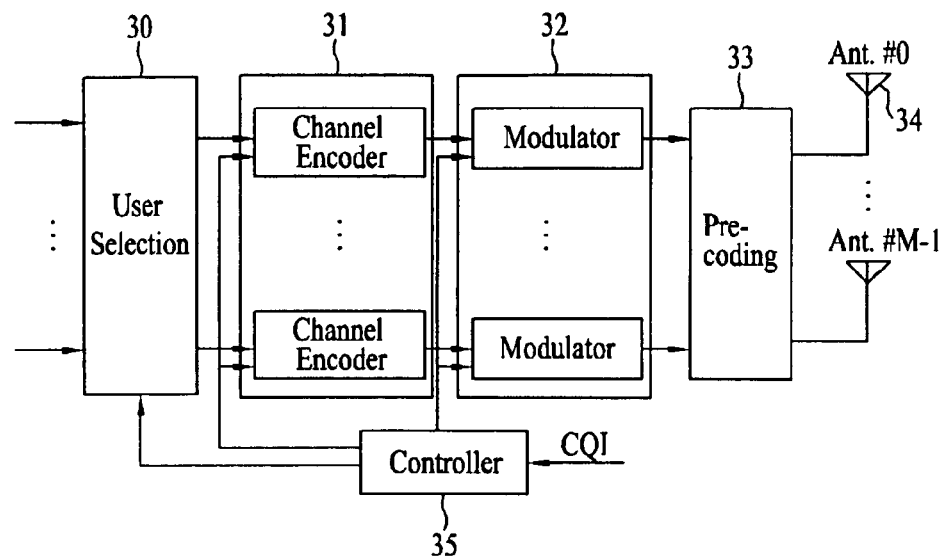
FIG. 3 illustrates an example structure of a transmitting end of a MIMO communication system according to an embodiment of the present invention.

FIG. 3 illustrates an example structure of a transmitting end of a MIMO communication system according to an embodiment of the present invention.

The transmitting end of FIG. 3 may be a base station or a terminal. User data, which is to be transmitted from the transmitting end (for example, a base station) to a receiving end, is input as a single stream or multiple data streams to a channel encoder 31. The channel encoder 31 performs channel encoding on the input user data. A modulator 32 performs constellation mapping on the encoded data. A preceding unit 33 multiplies the modulated symbols by a precoding matrix. The precoded signals are then transmitted through antennas 35.

The precoding matrix used at the preceding unit 33 can be constructed by combining an antenna selection matrix and a DFT matrix or can be selected from a codebook including one or more preceding matrices, each precoding matrix including a DFT matrix modified by an antenna selection element, as described above. This codebook may not only have the above characteristics but also include one or more preceding matrices of each rank that can be applied in a MIMO communication system.

On the other hand, the receiving end transmits feedback information to the transmitting end. The feedback information may include Channel Quality Information (CQI), Precoding Matrix Information (PMI), and the like and it is preferable that the preceding matrix used at the preceding unit 33 be selected taking into consideration the feedback information. A controller 35 performs selection of a user or precoding matrices using the feedback information from the receiving end.

Figure 4:
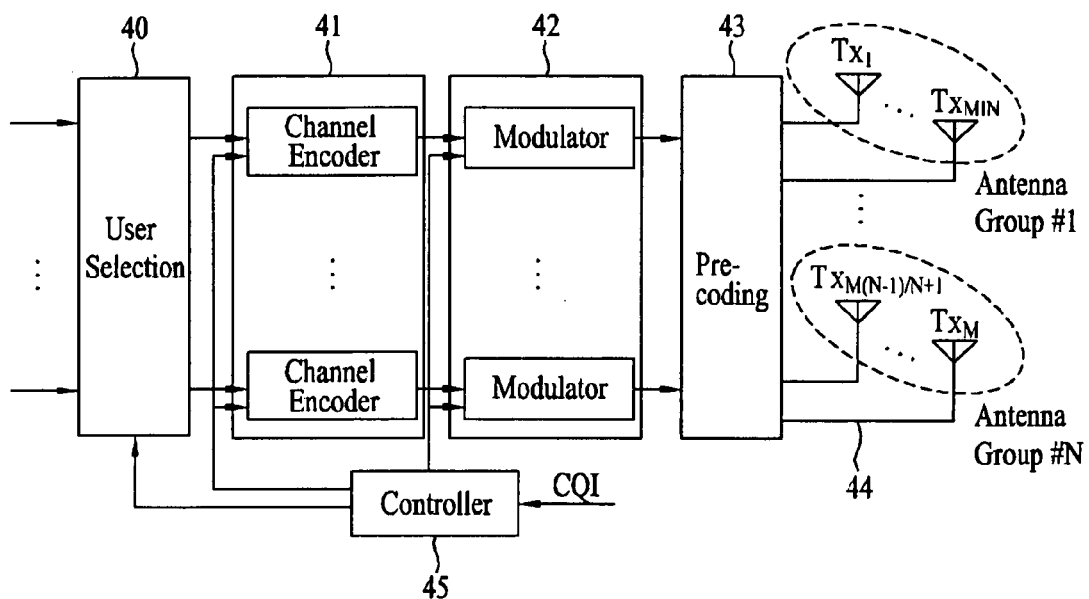
FIG. 4 illustrates another example structure of a transmitting end of a MIMO communication system according to an embodiment of the present invention.

FIG. 4 illustrates another example structure of a transmitting end of a MIMO communication system according to an embodiment of the present invention.

Similar to that of FIG. 3, the transmitting end of FIG. 4 may be a base station or a terminal. User data, which is to be transmitted from the transmitting end (for example, a base station) to a receiving end, is input as a single stream or multiple data streams to a channel encoder 41. The channel encoder 41 performs channel encoding on the input user data. A modulator 42 performs constellation mapping on the encoded data. A preceding unit 43 according to the present invention performs preceding on the modulated data using a preceding vector or a precoding matrix selected from a codebook suggested in the present invention and the precoded signals are then transmitted through multiple transmit antennas 44 as described above with reference to FIG. 3. These configurations of the components of the transmitting end of FIG. 4 are similar to those of FIG. 3.

However, the transmitting end of FIG. 4 is different from that of FIG. 3 in that antennas are arranged such that N groups of antennas, each antenna being λ/2 apart from each other to perform a beamforming function, are 4λ or 10λ apart from each other so as to perform a MIMO function. That is, when a MIMO function is performed, N antennas among all antennas are used since only one antenna is used in each group when the MIMO function is performed. A different antenna configuration may be applied according to the antenna transmission method.

Figure 5:
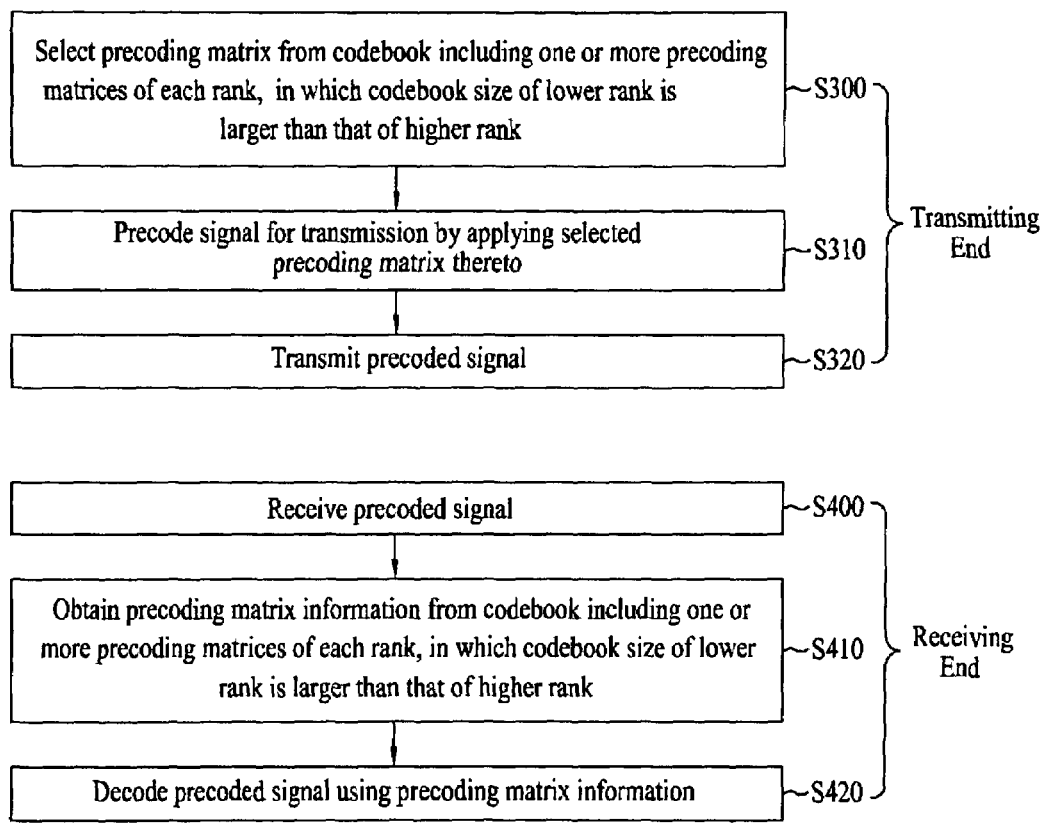
FIG. 5 is a flow chart illustrating an example method for transmitting and receiving a precoded signal in a MIMO communication system according to an embodiment of the present invention.

FIG. 5 is a flow chart illustrating an example method for transmitting and receiving a precoded signal in a MIMO communication system according to an embodiment of the present invention.

According to the method for transmitting a precoded signal in this embodiment, first, a precoding matrix is selected from a codebook at step S300. Here, the codebook is characterized in that the codebook includes one or more preceding matrices for each rank while the codebook size of a lower rank is larger than that of a higher rank. Namely, the codebook includes one or more preceding matrices of each of a plurality of ranks while the number of preceding matrices of a lower rank among the plurality of ranks is greater than the number of precoding matrices of a higher rank.

Here, the lower rank is one of a set of ranks including the rank 1 for transmitting a small number of streams, whereas the higher rank is one of a set of ranks for transmitting a large number of streams. Which ranks are included in the lower rank set and which ranks are included in the higher rank set can be determined taking into consideration the highest rank number and the system situation. For example, when the highest rank is 4, a set of lower ranks and a set of higher ranks may be defined such that the rank 1 and the rank 2 are included in the lower rank set and the rank 3 and the rank 4 are included in the higher rank set. The definitions of the lower and higher ranks may be fixed in the system or may vary depending upon circumstances.

Then, the receiving end performs preceding on a signal for transmission by applying the preceding matrix selected at step S310 to the signal for transmission and transmits the precoded signal at step S320. Then, the receiving end receives the precoded signal at step S400, obtains preceding matrix information from the codebook having the characteristics described above at step S410, and decodes the precoded signal using the precoding matrix information at step S420. Here, the codebook used at step S410 will be identical to the codebook that the transmitting end used at step S310 as described above.

The receiving end may further select an appropriate preceding matrix from the codebook, which the transmitting and receiving ends used at steps S310 and S410, according to channel quality measured based on a pilot signal received from the transmitting end and may feed index information of the selected precoding matrix to the transmitting end.

When the number of transmit antennas is 4 and the highest rank number is 4, the codebook of Table 8 can be used as the codebook having such characteristics. In Table 8, the number of preceding matrices for the rank 1 is 32 and the number of preceding matrices for the rank 2 is 24. In addition, the number of precoding matrices for the rank 3 is 8 and the number of preceding matrices for the rank 4 is 1. Thus, it can be seen from Table 8 that the codebook size of the lower rank is larger than the codebook size of the higher rank.

The codebook according to this embodiment is characterized in that the entirety of the codebook is indexed to eliminate the need for separate rank adaptation and has an advantage in that the probability that the rank 1 and the rank 2 are selected is increased since the codebook size of the ranks 1 and 2 is larger than the codebook size of the ranks 3 and 4. In the case of actual channels, the probability that the rank 3 and the rank 4 will be selected is relatively small, compared to the probability that the rank 1 and the rank 2 will be selected, and therefore, if the codebook according to this embodiment is used, it is possible to increase codebook efficiency, compared to a conventional codebook in which the codebook size of each rank is equal.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node above the BS as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

As is apparent from the above description, a method for transmitting and receiving a precoded signal in a Multi-Input Multi-Output (MIMO) communication system according to the above embodiments of the present invention has a variety of advantages.

For example, it is possible to perform preceding using a more efficiently designed codebook.

In addition, it is possible to perform path selection for antennas other than a deep fading antenna through a codebook including preceding matrices determined taking into consideration both antenna selection and path selection, thereby increasing the performance of the codebook.

Further, it is possible to reduce the amount of feedback information for separate rank information through a codebook including preceding matrices of a plurality of ranks, thereby reducing uplink overhead.

Furthermore, it is possible to incorporate a larger number of preceding matrices of ranks which are highly likely to be selected into a codebook including different sizes of ranks.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method for transmitting a precoded signal in a Multi-Input Multi-Output (MIMO) communication system, the method comprising:
    selecting a precoding matrix from a codebook including one or more precoding matrices of each rank, each of the precoding matrices including a unitary matrix modified by an antenna selection element;
    precoding a signal for transmission by applying the selected precoding matrix to the signal for transmission; and
    transmitting the precoded signal through a selected antenna,
    wherein, in the codebook, a codebook size of rank 1 and rank 2 is larger than a codebook size of rank 3 and rank 4.

2. The method according to claim 1, wherein the precoding matrix includes a combination of an antenna selection matrix and a unitary matrix determined according to the number of antennas selected according to the antenna selection matrix.

3. The method according to claim 1, wherein the unitary matrix is a Discrete Fourier Transform (DFT) matrix.

4. The method according to claim 2, wherein the unitary matrix is a Discrete Fourier Transform (DFT) matrix.

5. The method according to claim 1, wherein the precoding matrix is constructed using a phase shift matrix determined according to the number of selected antennas.

6. A method for receiving a precoded signal in a Multi-Input Multi-Output (MIMO) communication system, the method comprising:
- receiving a precoded signal;
- obtaining precoding matrix information from a codebook including one or more precoding matrices of each rank, each of the precoding matrices including a unitary matrix modified by an antenna selection element; and
- decoding the precoded signal based on the precoding matrix information,
- wherein, in the codebook, a codebook size of rank 1 and rank 2 is larger than a codebook size of rank 3 and rank 4.

7. The method according to claim 6, wherein the precoding matrix includes a combination of an antenna selection matrix and a unitary matrix determined according to the number of antennas selected according to the antenna selection matrix.

8. The method according to claim 7, wherein the unitary matrix is a Discrete Fourier Transform (DFT) matrix.

9. The method according to claim 6, wherein the unitary matrix is a Discrete Fourier Transform (DFT) matrix.

10. The method according to claim 6, wherein the precoding matrix is constructed using a phase shift matrix determined according to the number of selected antennas.

* * * * *